United States Patent
Wright et al.

(10) Patent No.: US 11,213,005 B1
(45) Date of Patent: Jan. 4, 2022

(54) PRO PET

(71) Applicants: Todd A. Wright, Richardson, TX (US); Antjuan Foster, Addison, TX (US)

(72) Inventors: Todd A. Wright, Richardson, TX (US); Antjuan Foster, Addison, TX (US)

( * ) Notice: Subject to any disclaimer, the term of this patent is extended or adjusted under 35 U.S.C. 154(b) by 0 days.

(21) Appl. No.: 16/153,308

(22) Filed: Oct. 5, 2018

Related U.S. Application Data

(60) Provisional application No. 62/571,075, filed on Oct. 11, 2017.

(51) Int. Cl.
*A01K 1/02* (2006.01)
*A01K 1/035* (2006.01)

(52) U.S. Cl.
CPC ............ *A01K 1/0245* (2013.01); *A01K 1/029* (2013.01); *A01K 1/0272* (2013.01); *A01K 1/0353* (2013.01)

(58) Field of Classification Search
CPC .... A01K 1/0107; A01K 1/033; A01K 1/0047; A01K 1/0245; A01K 1/0236; A01K 1/03; A01K 1/031; A01K 1/0035; A01K 1/0254; A01K 1/0281; A01K 1/035
USPC ....... 119/500, 482, 165, 497, 418, 419, 470, 119/484, 493
See application file for complete search history.

(56) References Cited

U.S. PATENT DOCUMENTS

| | | | | |
|---|---|---|---|---|
| 6,446,577 | B1 * | 9/2002 | Salahor | A01K 1/0254 119/470 |
| 7,789,044 | B2 * | 9/2010 | McGrade | A01K 1/0254 119/496 |
| 8,485,131 | B2 * | 7/2013 | Veness | A01K 1/0107 119/165 |
| D706,492 | S * | 6/2014 | Bratton | D30/112 |
| D822,912 | S * | 7/2018 | Edmonds | D30/119 |
| D833,085 | S * | 11/2018 | Edmonds | D30/119 |
| 2010/0031895 | A1 * | 2/2010 | Pierpont | A01K 1/033 119/499 |
| 2014/0261222 | A1 * | 9/2014 | Hampel | B29C 49/0047 119/502 |
| 2015/0351361 | A1 * | 12/2015 | VanBuuren | A01K 1/033 119/416 |
| 2017/0118950 | A1 * | 5/2017 | Xu | E04H 15/58 |

* cited by examiner

*Primary Examiner* — Yvonne R Abbott-Lewis
(74) *Attorney, Agent, or Firm* — Wilson Daniel Swayze, Jr.

(57) ABSTRACT

A portable pet carrier is configured to allow the user to carry pet during travel, is disclosed. The pet carrier or carrier device comprises a sturdy handle at its top for easy carrying by the user while travelling. The carrier is having a cage door at its front for entry and exit of the pet. The pet container is provided with detachable food and water chamber. Further, a detachable base unit is incorporated in the pet carrier for easy cleaning of pet waste. The pads or blankets incorporated on the pet carrier could be customized with one or more base colors and printed images for the user, for example, sports fans to show off their favorite team color and spirit. The carrier device could be manufactured in different sizes such that the components are arranged to provide safety and comfort to the pet.

8 Claims, 10 Drawing Sheets

PRO PET

BACKGROUND OF THE INVENTION

A. Technical Field

The present invention generally relates to a pet carrier device. More specifically, the present invention relates to a device for easy transportation, feeding and watering of the pet during travel. It is a very stylish carrier that shows support for the favorite team of the pet owner.

B. Description of Related Art

Generally, people who love and care for pets, they treat them as extensions of their family They want to take their pets everywhere they go, especially when it's an outing for entertainment. The enjoyment and pleasure derived from owning a pet compel individuals to spend as much time as possible with them. The most popular pet for traveling with their owners is dog. Although cats are seen in some travels too, but dogs do excursions better, being much more focused on their owners and don't tend to wander as much. There are other animals as well who require pet carriers, but dogs and cats are the most popular. Travel accessories that are available on the market today consist of a wide range of products. One of the most important products a pet owner can possess is the pet carrier. A pet carrier confines the pet and keeps the animal safe. The pet carrier also provides a means of transport. Once suitably adapted to a pet carrier, the animal can enjoy and feel secure in the carrier.

Further, sports fans and especially football fans like to bring their pets along with them particularly to the phenomenon of tailgating. Other events are popular such as outdoor concerts, fairs, shows, etc. The dedicated football fan never celebrates an event without supporting their favorite team. Sports team colors and paraphernalia are often used to adorn their pets. There are many varieties of sports related products, people purchase to show their favorite team colors and spirit. Many of these involve dressing the animal up in various colors and costumes and other types of displays. However, the pet carrier does miss the marking out the celebration of team colors and spirit. The pet carrier usually consists of drab colors such as beige or gray. These are not terribly exciting colors or décor for such a large item in the travel inventory.

Typically, most pet carriers in the prior art are rounded edge, rectangular cubes with a front opening door. They are a combination of rigid plastic and wire forms. They do not have any capability to adjust air flow for pet comfort or prevent the intrusion of the elements. They are not easy to keep clean and certainly are not decorative. Feeding and watering of the pet is difficult and cleaning up of the carrier is not efficient.

Therefore, there is a need for a unique design of a pet carrier to protect and carry the pet conveniently and safely. Further, there is also a need for a decorative portable pet carrier, for easy carrying and marking out the celebration of team colors during a match.

SUMMARY OF THE INVENTION

The present invention relates to a decorative portable pet carrier designed to allow the user for easy transport, feeding, and watering of pet. The carrier has been designed in a very stylish manner that shows support for the favorite sports team of the pet owner. The carrier is designed with molded plastic and is sized to fit small to large size pets. It comprises vents with adjustable covers to provide optimum comfort to the pets. The whole device is shaped like a helmet where the face mask is the front door. Further, it comprises removable/detachable food and water bowls, which further can be replaced with a curved strap, making more rooms in the pet carrier. Pads and/or blankets of the pet carrier are configured with the design of sports team logos, from which the pet owner can choose a pet carrier with the required team logo. In one embodiment, the carrier can also be supplied with a custom pad with the team colors and logo, or a blanket with similar markings. In further embodiment, the helmet can be supplied with high school or college colors and logos, or even corporate colors, or various types of selected images.

In an embodiment, the pet carrier is constructed of durable and light-weight materials. It can show off for user's favorite team instead of usual drab and dull colored pet carrier. It further features screened vents on the sides and top of the carrier, which are adjustable according to weather conditions. A cage door on the front side of the pet carrier is designed to emulate the face guard of the professional team helmet. The cage door swings up and out of the way on its hinge. A latch is configured at the base to allow easy entry and exit of the pet.

In one embodiment, a tray is positioned at the bottom area, on the front side of the carrier and allows to provide food and water to the pet during travel time. The tray container is partitioned and can slide in and out for easy access. The tray can be substituted when not in use, with a single gate piece that will provide more interior rooms. A stand is configured underneath the carrier with a sliding tray. The tray is able to slide in and out, and helps in the disposal of pet waste and debris. A set of caster wheels are provided beneath the sliding tray for the easy movement of the carrier. The casters will be locked for the secure placement of the carrier. Each tray is provided with a handle for easy manipulation of moving the trays in and out. A sturdy handle is located at the top of the carrier, for carrying the carrier during travel. The top section of the carrier is detachable from the lower base to allow easy cleaning. Matching blankets and comfortable pad provide comfort to the pet while travelling. The carrier is designed from all safety and comfort aspects of the pet and the stylish aspect covers the coloring and logo painting on the blankets and pads for the users such as, pet owner, or sports fan.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1:
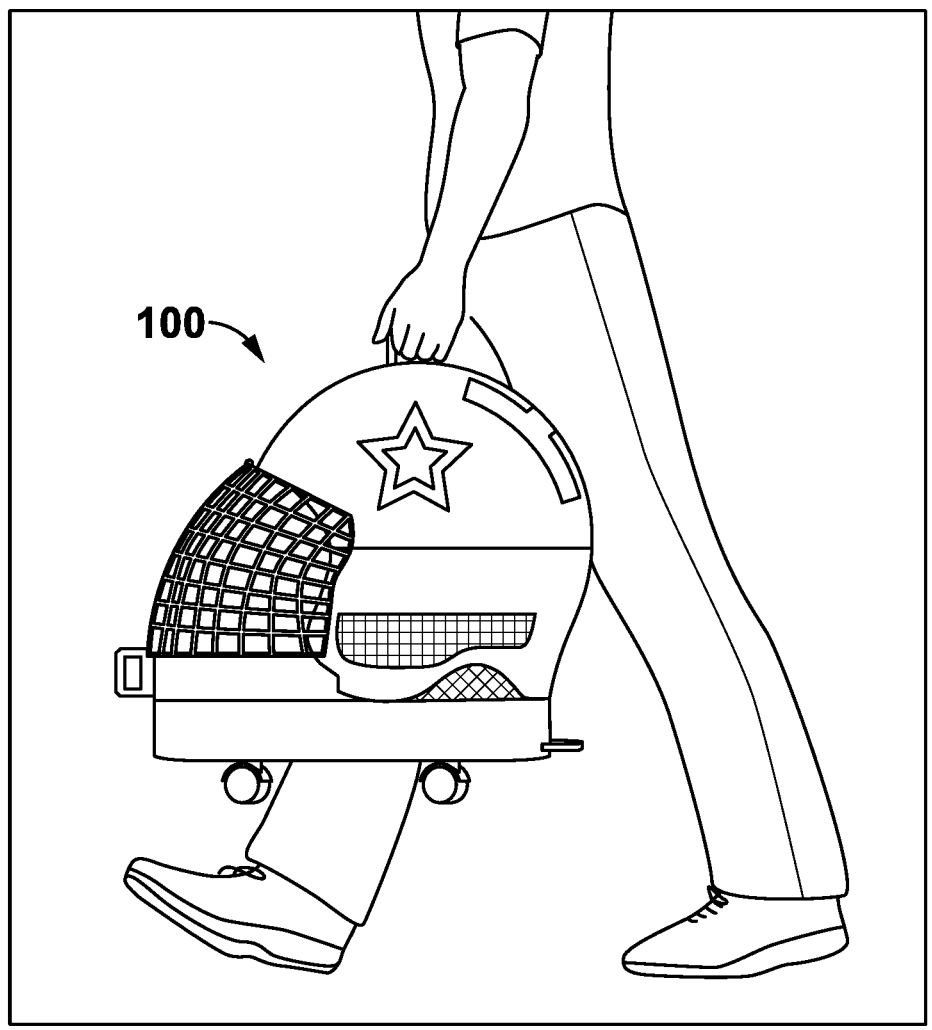
FIG. 1 shows a perspective view of a pet carrier to be carried by a user during travel, according to an embodiment of the present invention.
Figure 2:
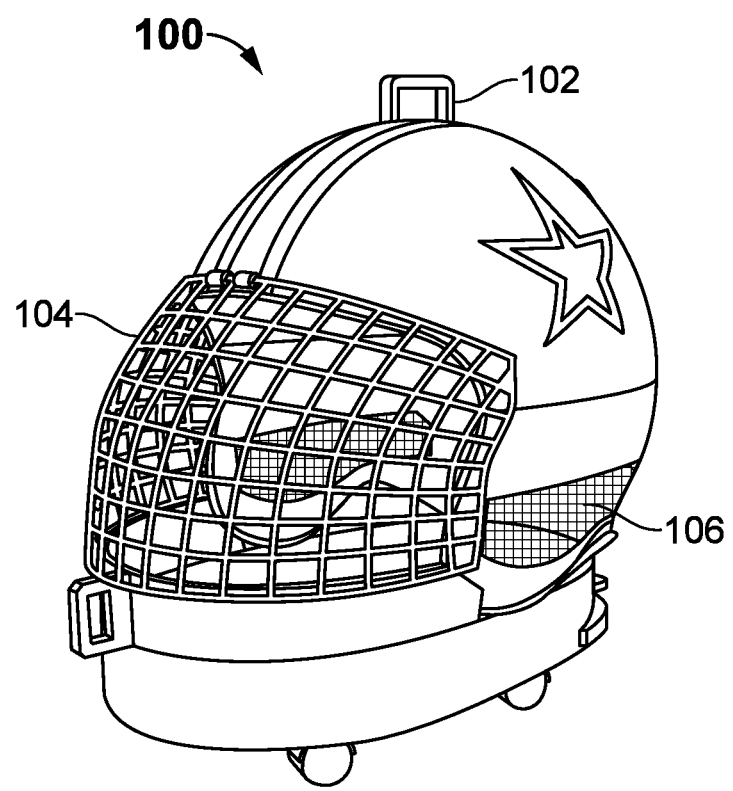
FIG. 2 illustrates a front perspective view of the pet carrier, according to an embodiment of the present invention.

Referring to FIG. 1, a perspective view of a pet carrier 100 to be carried by a user during travel, is disclosed. In an embodiment, the pet carrier 100 provides an innovative and unique solution to the problems related to the above mentioned existing carriers. The pet carrier 100 is designed to imitate a sports fans favorite team helmet. The pet carrier 100 is made of durable and light-weight materials. In an embodiment, the pet carrier is made up of at least molded plastics. FIG. 2 illustrates a front perspective view of the pet carrier 100, which is configured with a sturdy handle 102 on its top, according to an embodiment of the present invention. The handle 102 helps its user to carry the pet carrier while travelling. Further, the pet carrier 100 is installed with a face mask/cage door 104, according to an embodiment of the present invention. In another embodiment, the cage door 104 is made up of welded wires. The invention uses various types of plastic components. These plastic components are either injection molded, blow molded, or rotationally molded as the shape dictates. For example, the face mask or the cage door will be injection molded while the helmet crown will be either rotational or blow molded. All components will be molded from polypropylene plastic. This plastic is very durable, is highly resistant to household chemicals and ultraviolet degradation. These kind of plastic components are very easy to clean using soap and water, and is often used in this application.

Figure 3:
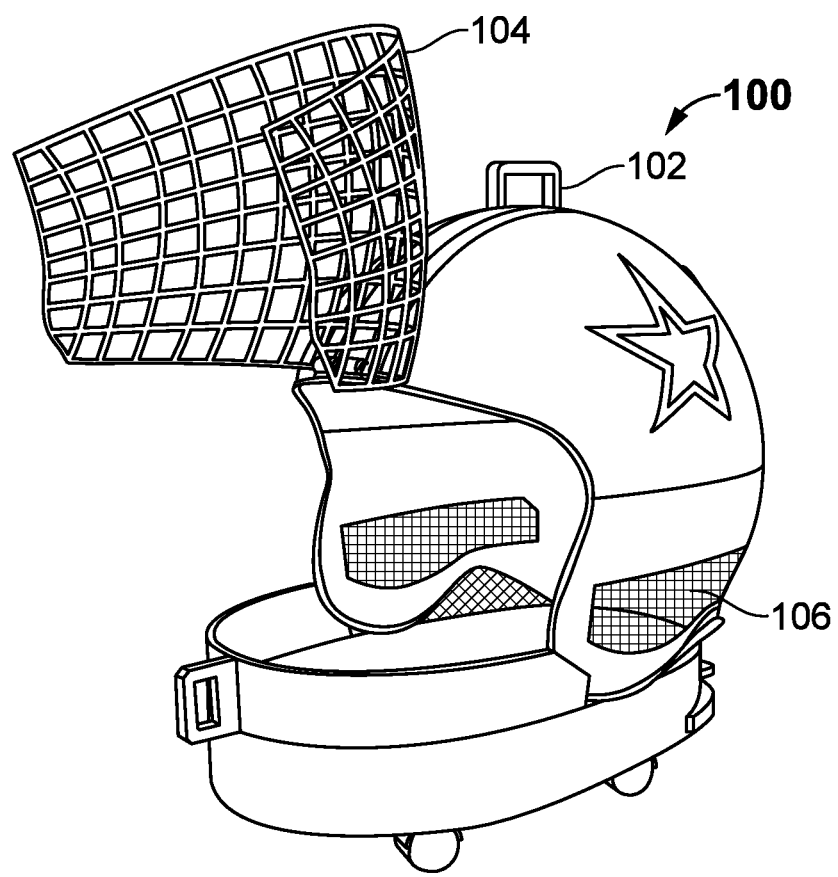
FIG. 3 shows a front perspective view of an opened cage door in the front portion of the pet carrier, according to an embodiment of the present invention.

The face mask 104 is the front door of the carrier. A 0.125" diameter, stainless steel 304 type wire is used to keep the pet contained. The wire is supplied to the fabricator on a spool, is de-reeled, and cut to length as required. One longer section of wire is robotically bent to make the face mask perimeter in shape. The cut pieces are then robotically placed into a fixture on 1" center and are welded together. After welding, cleaning, and passivation, the flat mask is placed in a hydraulic press in a mold and pressed into the final curved shape. FIG. 3 shows a front perspective view of an opened cage door in the front portion of the pet carrier, according to an embodiment of the present invention. The cage door 104 can move up and out whenever necessary. A latch when released at the base, allows easy entry and exit of the pet. Further, the pet carrier 100 contains side wise screen vents 106 for proper ventilation. The face mask 104 flips up to remove the pet from the carrier and is secured in place with the magnetic latch that cannot be opened by the pet. Both left and right edges of the face mask 104 have to be pulled outward simultaneously for the face mask catches to release and the door to be rotated upward.

Figure 4:
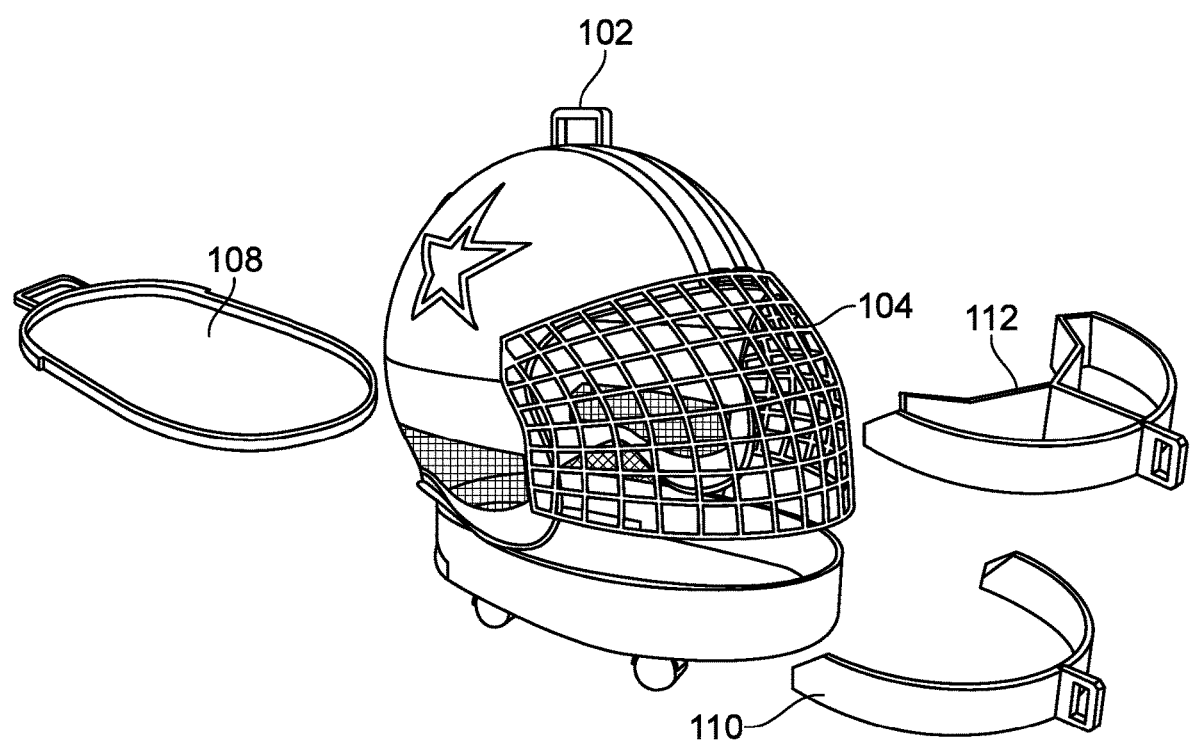
FIG. 4 illustrates an exploded view of one or more components of the pet carrier, according to an embodiment of the present invention.

FIG. 4 an exploded view of one or more components of the pet carrier, according to an embodiment of the present invention. The lower part 122 of the carrier contains a base tray unit 108. Food or water bowls 112 are located in the front, just under the lower edge of the welded wire face mask 104. Once the pet is fed, the food or water bowl 112 can be removed and a gate section 110 is installed to provide more rooms in the carrier 100, for the pet. The exterior surface of the food and water bowl 112 and the gate section 110 are curved and are of the same thickness, so they look alike from the side or front when attached to the base. The base tray unit 108 could be positioned below the bowls 112. The base tray unit 108 is configured to pull out, so any waste, dirt, debris, or spilled water can easily be removed, and thereby the base tray unit 108 is wiped clean, and re-installed.

Figure 5:
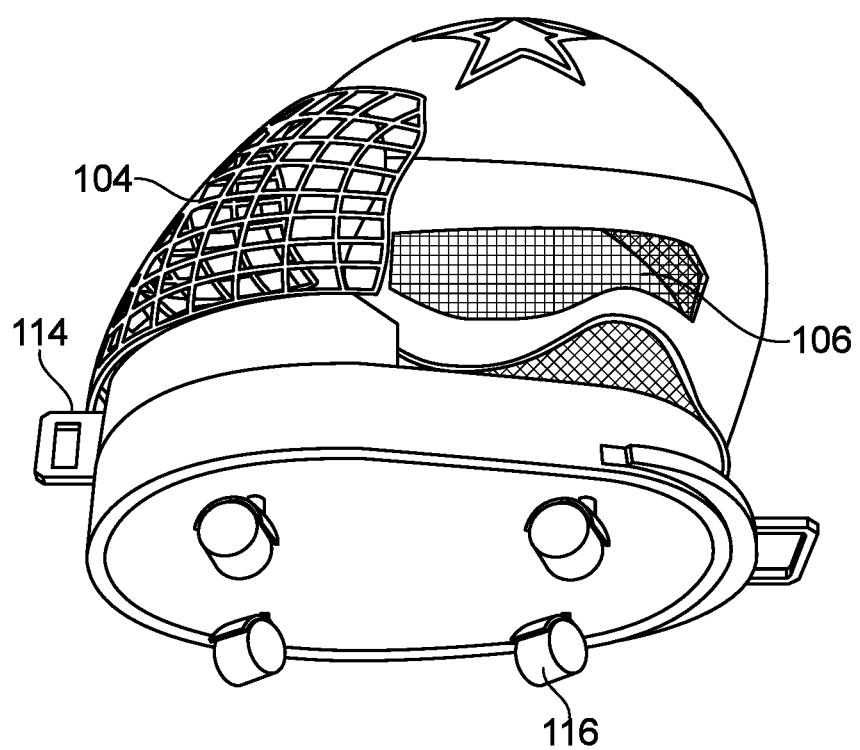
FIG. 5 shows a bottom perspective view of the pet carrier, according to an embodiment of the present invention.

FIG. 5 shows a bottom perspective view of the pet carrier 100, according to an embodiment of the present invention. Beneath the sliding base tray unit 108, a set of caster wheels 116 are provided for ease of movement. The caster wheel 116 could be locked for secure placement of carrier 100, whenever necessary. The caster wheel 116 could be a non-marking, non-skid rubber wheels, which are capable of supporting up to 100 pounds each. The casters are of 2" diameter and 0.75" wide, implemented with a rectangular metal base which could be screwed to the bottom of the pet carrier base sections. The polyurethane rubber tread rolls easily and has good abrasion resistance. So, the pet carrier 100 can be rolled almost anywhere. In some embodiments, the tray unit comprises one or more handles to provide ease in operation of the tray incorporated in the carrier 100.

Figure 6:
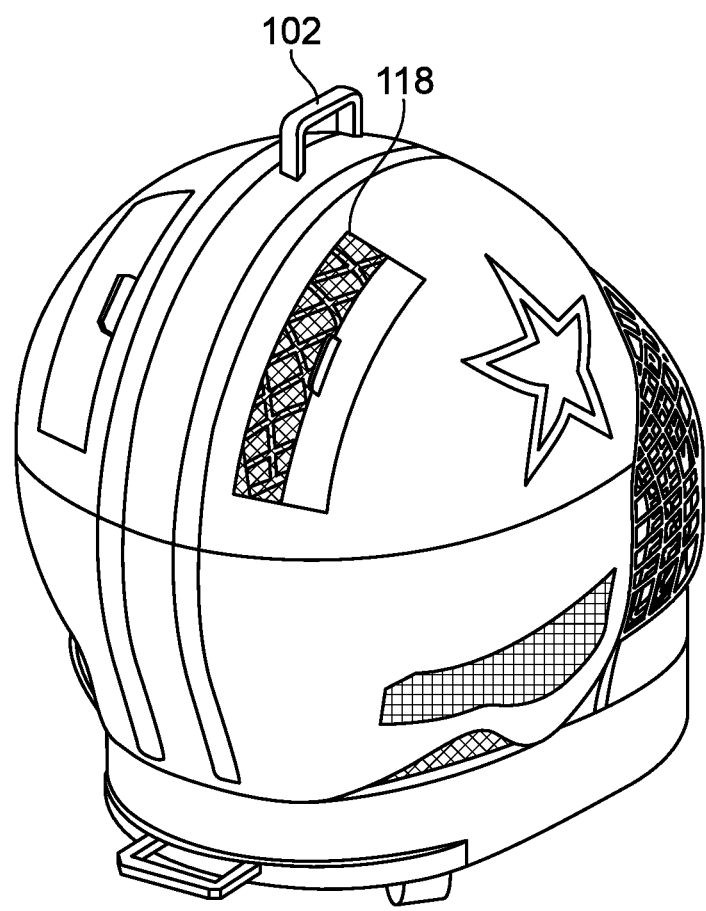
FIG. 6 shows a top perspective view of the pet carrier, according to an embodiment of the present invention.
Figure 7:
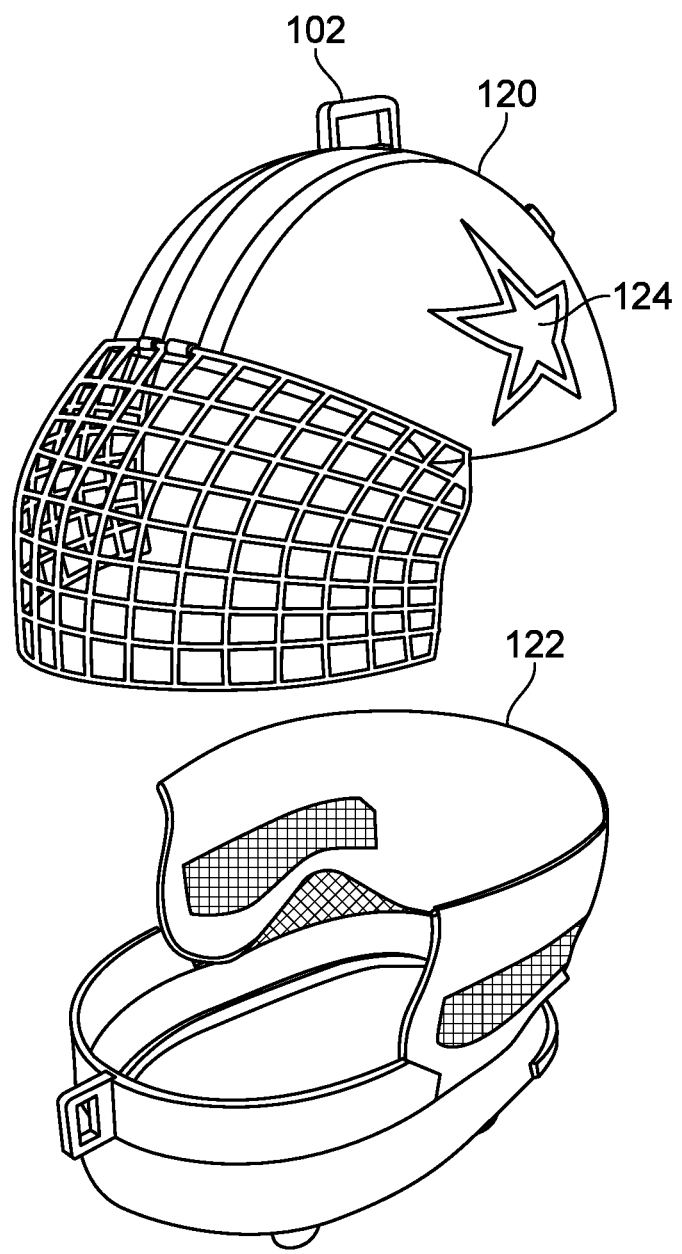
FIG. 7 shows a front perspective view of detachable top and bottom section of the pet carrier, according to an embodiment of the present invention.

FIG. 6 shows a top perspective view of the pet carrier 100, according to an embodiment of the present invention. The top section 120 of the pet carrier 100 comprises a ventilation screen/screen vents 118. The pet carrier 100 contains side screen vents 106 or top screen vents 118. In some embodiments, the screen vents (106 and 118) is a stainless steel mesh. The mesh is welded on 0.5" centers using 19 gauge (0.036") diameter wire. In one embodiment, the mesh could be cut into shape using a flywheel press and a special die. After cutting, it is placed in the molded pockets in the molded plastic shell and thermally bonded in place. All loose ends are covered with thermally bonded plastic trim pieces, so the pet cannot be injured and cannot claw them loose. As shown in FIG. 7, a top section 120 of the pet carrier can be completely detachable from a bottom section 122. The entire top section 120 of the pet carrier could be separated from the base 122 to allow easy cleaning.

Figure 8:
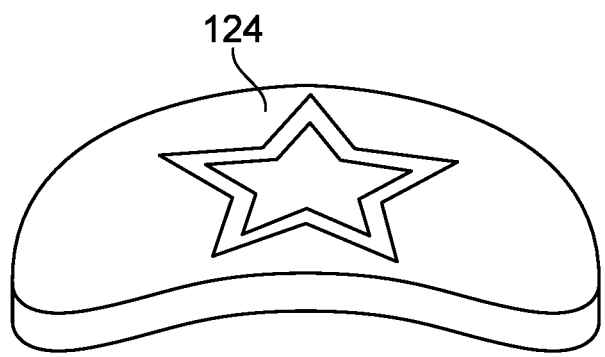
FIG. 8 shows a top perspective view of one or more pads or blankets on the pet carrier, according to an embodiment of the present invention.

Referring to FIG. 8, decorative pads or blankets 124 are illustrated, according to an embodiment of the present invention. Matching blankets or a comfortable pad 124 provide comfort to the pet while traveling. The pet carrier 100 is a unique device that shows the colors and spirit of sports fans while providing safety transport for their pet. The pet carrier 100 is shaped fashionable like a football helmet, including the team colors and logo. Said pads or blankets 124 are commercially available foam pads or blankets, provided to the manufacturer in colors and patterns as they require for the carrier. Further, said pads or blankets 124 fit into the base section and can be sponged off to clean, while the blankets can be machine washed and dried. The helmet like pet carrier 100 can be manufactured in almost any base color of and with almost any logo or image of a school, professional team, or company. In an embodiment, the pet carrier 100 can also be manufactured with a custom pad with the team colors and logo, or a blanket with similar markings. In another embodiment, the helmet can be manufactured in one or more high school or college colors and logos, or even corporate colors, or with various selected images.

Figure 9:
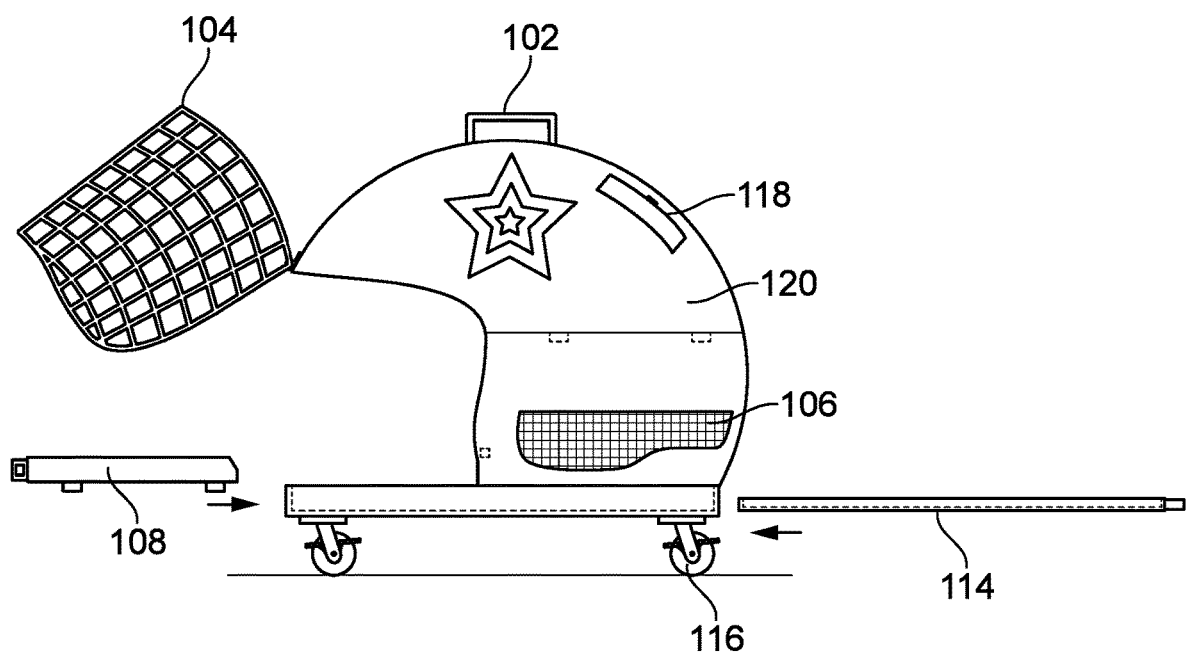
FIG. 9 shows a side view with opened face mask and components of the pet carrier, according to an embodiment of the present invention.
Figure 10:
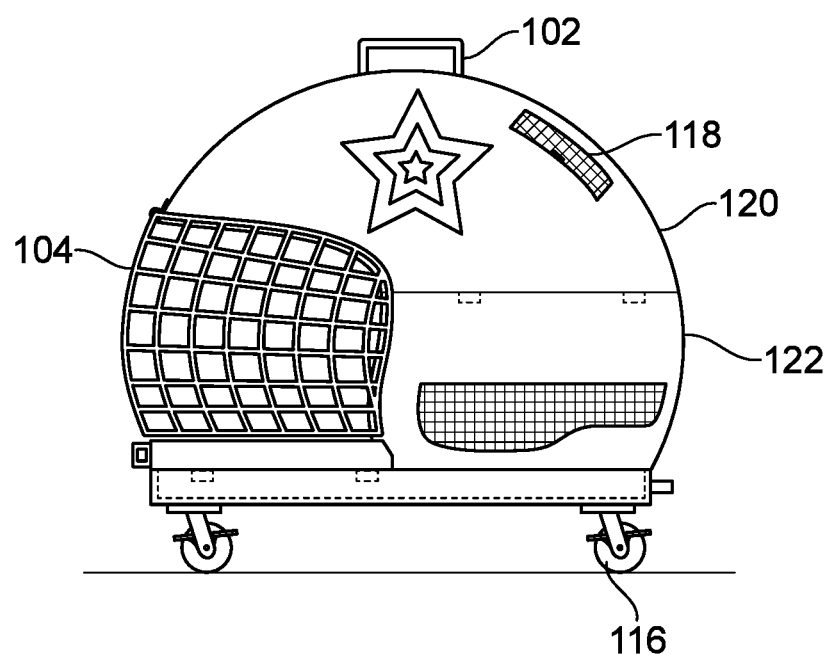
FIG. 10 shows a side view with closed face mask and components of the pet carrier, according to an embodiment of the present invention.

Referring to FIG. 9 shows a side view of the pet carrier 100 with its front door open, according to an embodiment of the present invention. The caster wheel 116 are non-marking, non-skid wheels. They lock when brake is pressed and roll freely when the brake is released, allowing easy transportation of the pet. The stainless steel wired face mask like cage door 104 pivots at the top center of the pet carrier 100 and locks into place at its cheeks using strong magnets. Some metal targets are adhesively bonded to the cheek locations and are ridged to provide additional holding force when the mating contour magnets on the cage door 104 are attracted to the steel targets in the helmet section. The helmet like pet carrier 100 is manufactured with the base color of the team logo molded into the plastic and the logo can be applied/coated using a UV ink printed decal, or both the carrier and the logo can be robotically painted on the product. The compartmentalized food and water bowl 112 insert snaps onto the base 122 of the carrier or can be replaced with the gate section 110 that increases the interior space. Further, the screen vents (106 and 118), can be opened or closed based on the external environmental condition, or user's choice. The base tray unit 114 can be moved out of the carrier for cleaning purpose. The unique pet carrier 100 can be manufactured with matching foam pads or blankets 124 for providing comfort to the pet. Referring to FIG. 10, a side view of the pet carrier 100 with closed face mask 104 and opened top vent 118 is illustrated.

The pet carrier 100 is designed to be aesthetic and effective in application. The user benefits from improved style, ease of use, and pet comfort and safety. Further, the pet carrier 100 is unique as it comes in any professional team helmet configuration. The cage door 104 emulates helmet face guard and swings up and out of the way for access. It is well vented inside to keep pets cool. Further, during rainy season, the top screen vents 118 could be closed, which also helps to maintain warmth atmosphere inside. The wheel casters 116 are used for easy movement and can be locked for secure placement. The water or food bowl 112 can be slide out for water and food supply and can be substituted with a gate portion 110 to provide the carrier with more interior rooms. The pet carrier 100 is available in different size for larger or smaller pets. For example; up to 10 pounds a miniature size is available. 10 to 20 pounds of pet size can be supported by a small cage. 20 to 50 pounds of pet can be settled with a medium one, 50 to 100 pounds with a large one and an extra-large for 100 to 150 pounds of pet size.

Further, base tray unit 108 is removable/detachable for cleaning pet waste. Entire top portion 120 of the carrier 100 is removable/detachable for cleaning and access. Matching pads or blankets 124 are available for all types of such pet carrier. It is perfect for showing team colors while travelling with pet.

Preferred embodiments of this invention are described herein, including the best mode known to the inventors for carrying out the invention. It should be understood that the illustrated embodiments are exemplary only, and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

The invention claimed is:

1. A portable pert carrier to allow the user for easy transport, feeding, and watering of a pet, comprising:
   the portable pet carrier being configured as a football helmet;
   wherein the portable pet carrier includes a front door configured as a facemask of the football helmet;
   wherein the portable pet carrier includes detachable food bowl and a detachable water howl.

2. A portable pet carrier to allow for easy transport, feeding, and watering of a pet as in claim 1, wherein the detachable food bowl is replaceable with a first curved strap.

3. A portable pet carrier to allow the user for easy transport, feeding, and watering of a pet as in claim 1, wherein the detachable water bowl is replaceable with a second curved strap.

4. A portable pet carrier to allow the user for easy transport, feeding, and watering of a pet as in claim 1, wherein the portable pet carrier include a cushion.

5. A portable pet carrier to allow the user for easy transport, feeding, and watering of a pet as in claim 1, wherein the from door of the portable swings upwards when opened.

6. A portable pet carrier to allow the user for easy transport, feeding, and watering of a pet as in claim 1, wherein the portable pet carrier includes a tray being slidable.

7. A portable pet carrier to allow the user for easy transport, feeding, and watering of a pet as in claim 1, wherein the portable pet carrier includes a top section and a bottom section.

8. A portable pet carrier to allow the user for easy transport, feeding, and watering of a pet as in claim 7, wherein the top section is detachably connected to the bottom section.

* * * * *